(12) United States Patent
Sato et al.

(10) Patent No.: US 7,054,252 B2
(45) Date of Patent: May 30, 2006

(54) OPTICAL PICKUP WITH AN ABERRATION CORRECTION LENS ASSEMBLY

(75) Inventors: Makoto Sato, Tsurugashima (JP); Sakashi Ohtaki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 289 days.

(21) Appl. No.: 10/227,480

(22) Filed: Aug. 26, 2002

(65) Prior Publication Data

US 2003/0081530 A1    May 1, 2003

(30) Foreign Application Priority Data

Aug. 31, 2001    (JP)    ............................. 2001-263817

(51) Int. Cl.
*G11B 7/135*    (2006.01)
(52) U.S. Cl. ............................. 369/112.01; 369/112.24; 369/44.23
(58) Field of Classification Search ............ 369/112.24, 369/112.01, 112.23, 44.23; 359/637, 683, 359/692
See application file for complete search history.

(56) References Cited

U.S. PATENT DOCUMENTS

| | | | |
|---|---|---|---|
| 5,754,513 A | 5/1998 | Yagi et al. | |
| 5,995,292 A | 11/1999 | McDonald | |
| 6,097,691 A * | 8/2000 | Shimozono | ............ 369/112.24 |
| 6,108,139 A | 8/2000 | Takahashi | |
| 6,339,577 B1 * | 1/2002 | Hineno | ................... 369/112.24 |
| 6,418,108 B1 * | 7/2002 | Ueda et al. | ............. 369/112.23 |
| 6,469,819 B1 * | 10/2002 | Aarts | ......................... 359/210 |

(Continued)

FOREIGN PATENT DOCUMENTS

| | | |
|---|---|---|
| EP | EP 0 800 170 A2 | 10/1997 |
| EP | EP 1 043 615 A1 | 10/2000 |
| JP | 9-325270 | 12/1997 |

(Continued)

OTHER PUBLICATIONS

European Search Report Dated Dec. 10, 2002.

(Continued)

*Primary Examiner*—Brian E. Miller
*Assistant Examiner*—Peter Vincent Agustin
(74) *Attorney, Agent, or Firm*—McGinn IP Law Group PLLC

(57) ABSTRACT

An optical pickup records information on an optical recording medium and retrieves information from the optical recording medium by radiating a light beam on the optical recording medium. The optical pickup includes a light source which emits the light beam. The optical pickup also includes an object lens which directs the convergent light beam to a recording layer of the optical recording medium. The optical pickup further includes an aberration correction lens assembly located between the light source and the object lens. The aberration correction lens assembly includes at least one movable lens which is movable in an optical axis direction. The aberration correction lens assembly moves the movable lens to convert the light beam to a convergent light beam or a divergent light beam so as to correct spherical aberration. A distance between a principal plane of the aberration correction lens assembly on a light emergent side and a principal plane of the object lens falls within a range determined in accordance with a numerical aperture of the object lens, a focal length of the aberration correction lens assembly on the light emergent side, and a focal length of the object lens.

10 Claims, 7 Drawing Sheets

U.S. PATENT DOCUMENTS

| | | | |
|---|---|---|---|
| 6,728,179 B1 * | 4/2004 | Nakano et al. | 369/53.1 |
| 6,754,161 B1 * | 6/2004 | Masuhara et al. | 369/112.01 |
| 6,798,581 B1 * | 9/2004 | Yamamoto et al. | 359/637 |
| 2002/0012313 A1 * | 1/2002 | Kimura et al. | 369/112.08 |

FOREIGN PATENT DOCUMENTS

| | | |
|---|---|---|
| JP | 11-259906 | 9/1999 |
| JP | 2000-131603 | 5/2000 |

OTHER PUBLICATIONS

Benno H. W. Hendriks et al., "Single Digital Video Recording/Digital Versatile Disk objective and plastic Digital Video Recording objective", Jpn. J. Appl. Phys. vol. 41 (2002) pp. 1791-1797, Part 1, No. 3B, Mar. 2002, The Japan Society of Applied Physics.

European Office Action dated Mar. 11, 2005.

* cited by examiner

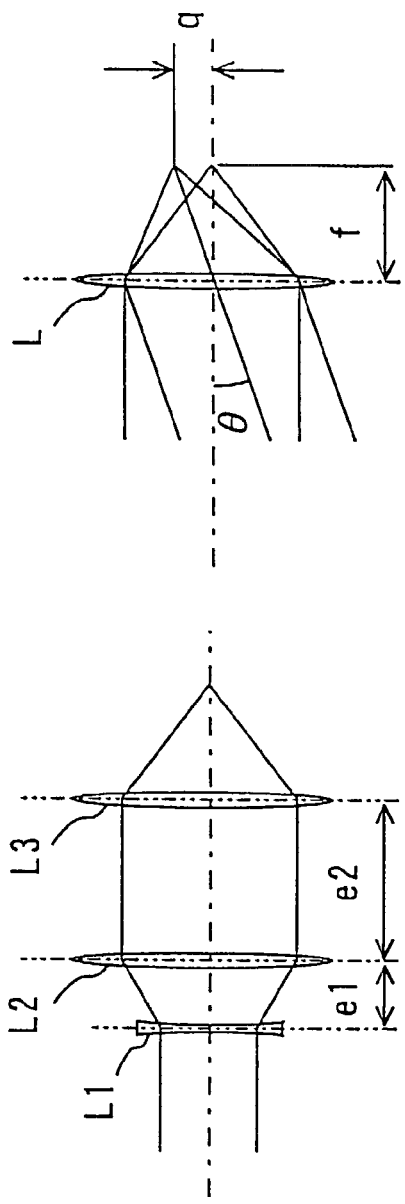
F I G . 2 A  F I G . 2 B
F I G . 3
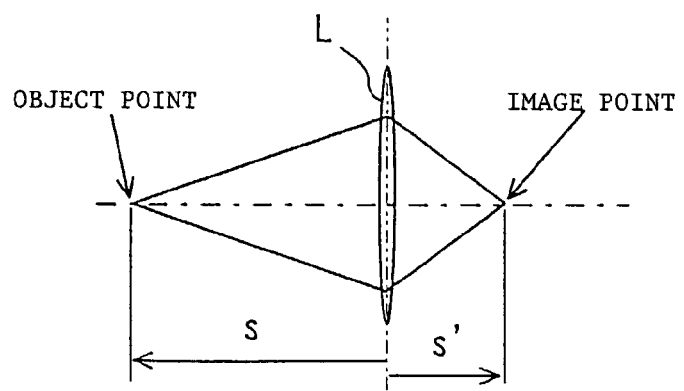

OPTICAL PICKUP WITH AN ABERRATION CORRECTION LENS ASSEMBLY

BACKGROUND OF THE INVENTION

1. Field of the Invention

The present invention relates to an optical pickup for recording information on a recording layer of an optical-type information recording medium such as optical disc and for retrieving (playing back) information from the recording layer by radiating a convergent light beam on the recording layer, and more particularly to an optical system used for such optical pickup.

2. Description of the Related Art

In recent times, optical discs are widely utilized as means for recording and retrieving information or data (e.g., image/video data, voice/sound data, and computer data). For example, high density recording type optical discs which are called DVDs (digital versatile discs) are marketed.

In order to increase the recording capacity, a next generation optical disc system is studied. In such optical disc system, it is desired that a violet laser having a short wavelength is used as a light source, and an optical pickup includes an object lens having a large numerical aperture (e.g., 0.8 or more). This would make it possible to record data (or information) on an optical disc at a density greater than DVD.

In general, a cover layer is placed on an uppermost recording layer of an optical disc. The cover layer is a light transmissive layer. When an object lens has a large numerical aperture, spherical aberration often occurs if a thickness of the cover layer deviates from a reference (standard) value, because the light beam passes through the cover layer when recording and retrieving the data. If the spherical aberration occurs in a great quantity, the object lens cannot show an originally designed (expected) spatial frequency characteristic (MTF: modulation transfer function). In particular, jitter increases due to irregularity in the cover layer thickness when short marks and pits are recorded and scanned (read, retrieved).

In order to solve such inconvenience, it is necessary to correct (compensate for) the spherical aberration resulting from the cover layer thickness irregularity. It is also necessary to correct another spherical aberration resulting from the object lens shape irregularity, which inevitably occurs during an object lens manufacturing process. To this end, use of an expander lens assembly, which has two lens (concave lens and convex lens), in an optical pickup is proposed in for example Japanese Patent Application Kokai No. 2000-131603. Alternative resolution can be found in Japanese Patent Application Kokai No. 11-259906, which has a mechanism to move a collimator lens.

When the expander lens assembly is used to correct the spherical aberration, a parallel light beam is transformed to a convergent light beam, a divergent light beam or another parallel light beam having a slightly different diameter by the expander lens assembly before the light beam is incident to the object lens, so that the light beam which has passed through the object lens has certain spherical aberration to counterbalance another spherical aberration which will be generated at the cover layer. If the cover layer has the reference thickness, the expander lens assembly changes (transforms) the parallel light beam to another parallel light beam having a slightly different diameter before the light beam enters the object lens. If the object lens is designed such that spherical aberration produced when the light beam passes through the object lens will be counterbalanced by spherical aberration produced at the cover layer having the reference thickness, then a spot created on a recording layer by the convergent light beam which has passed through the cover layer has no spherical aberration. On the other hand, if the cover layer's thickness deviates from the reference value, the expander lens assembly changes the parallel light beam to the convergent or divergent light beam before the light beam enters the object lens. The expander lens assembly changes the light beam such that spherical aberration produced when the convergent or divergent light beam passes through the object lens will be counterbalanced by spherical aberration produced at the cover layer. As a result, there is no spherical aberration on the recording layer.

For some of the high-density optical disc systems, it is desired to use a DPP (differential push pull) method for detection of tracking errors, which utilizes multiple beams, or to use a CTC (cross talk canceler) method for high density recordation.

If the optical pickup includes an optical system for spherical aberration correction such as expander lens assembly, and multiple beams are used, then spot-to-spot intervals (spot distance) of the multiple beams on the recording layer change upon actuation of the spherical aberration correcting optical system.

The change in the beam spot intervals deteriorates sensitivity of the tracking error detection in the DPP method, and changes a delay time between a main beam and a sub-beam in the CTC method.

SUMMARY OF THE INVENTION

An object of the present invention is to provide an optical pickup which can suppress the spot interval change on the recording layer even if the spherical aberration is corrected.

According to one aspect of the present invention, there is provided an optical pickup for recording information on an optical recording medium and retrieving information from the optical recording medium by radiating a light beam on the optical recording medium, comprising: a light source which emits the light beam; an object lens which directs a convergent light beam to a recording layer of the optical recording medium; and an aberration correction lens assembly between the light source and the object lens and including at least one movable lens which is movable in an optical axis direction. The aberration correction lens assembly controls (moves) the movable lens to convert the light beam to a convergent light beam or a divergent light beam so as to correct spherical aberration. A distance between a principal plane (surface) of the aberration correction lens assembly on a light emergent side and a principal plane of the object lens on a light incident side falls within a range determined in accordance with a numerical aperture of the object lens, a focal length of the aberration correction lens assembly on the light emergent side, and a focal length of the object lens. Even when the aberration correction lens assembly moves the movable lens to correct the spherical aberration, a variation in a beam spot distance can be restricted within a small range on the recording layer of the recording medium.

The distance between the principal plane of the aberration correction lens assembly on the light emergent side and the principal plane of the object lens may be determined fy the following equation:

$$(f_2+f_3) - \frac{10f_3^2}{3\sqrt[4]{NA}} < e_2 < (f_2+f_3) + \frac{10f_3^2}{3\sqrt[4]{NA}}$$

where $e_2$ represents the distance between the principal plane of the aberration correction lens assembly on the light emergent side and the principal plane of the object lens, NA represents the numerical aperture of the object lens, $f_2$ represents the focal length of the aberration correction lens assembly on the light emergent side, and $f_3$ represents the focal length of the object lens.

The aberration correction lens assembly may include a positive lens group and a negative lens group, and the movable lens may be included in the positive or negative lens group. A distance between a principal plane of the positive lens group and a principal plane of the negative lens group along the optical axis direction may be changed by the movable lens. The positive lens group may include only one lens, the negative lens group may include only one lens, and the only one lens may be the movable lens.

The movable lens may be a collimator lens which converts the light beam emitted from the light source into a generally parallel light beam.

The numerical aperture of the object lens may be 0.80 or more. The focal length of the object lens may be 2 mm or less.

BRIEF DESCRIPTION OF THE DRAWINGS

FIG. 2A schematically illustrates an optical system of the optical pickup shown in FIG. 1;

FIG. 2B illustrates a simplified optical system equivalent to the optical system shown in FIG. 2A;

FIG. 3 illustrates an optical system used to describe a lateral magnification;

DETAILED DESCRIPTION OF THE INVENTION

Embodiments of the present invention will be described in reference to the accompanying drawings.

Figure 1:
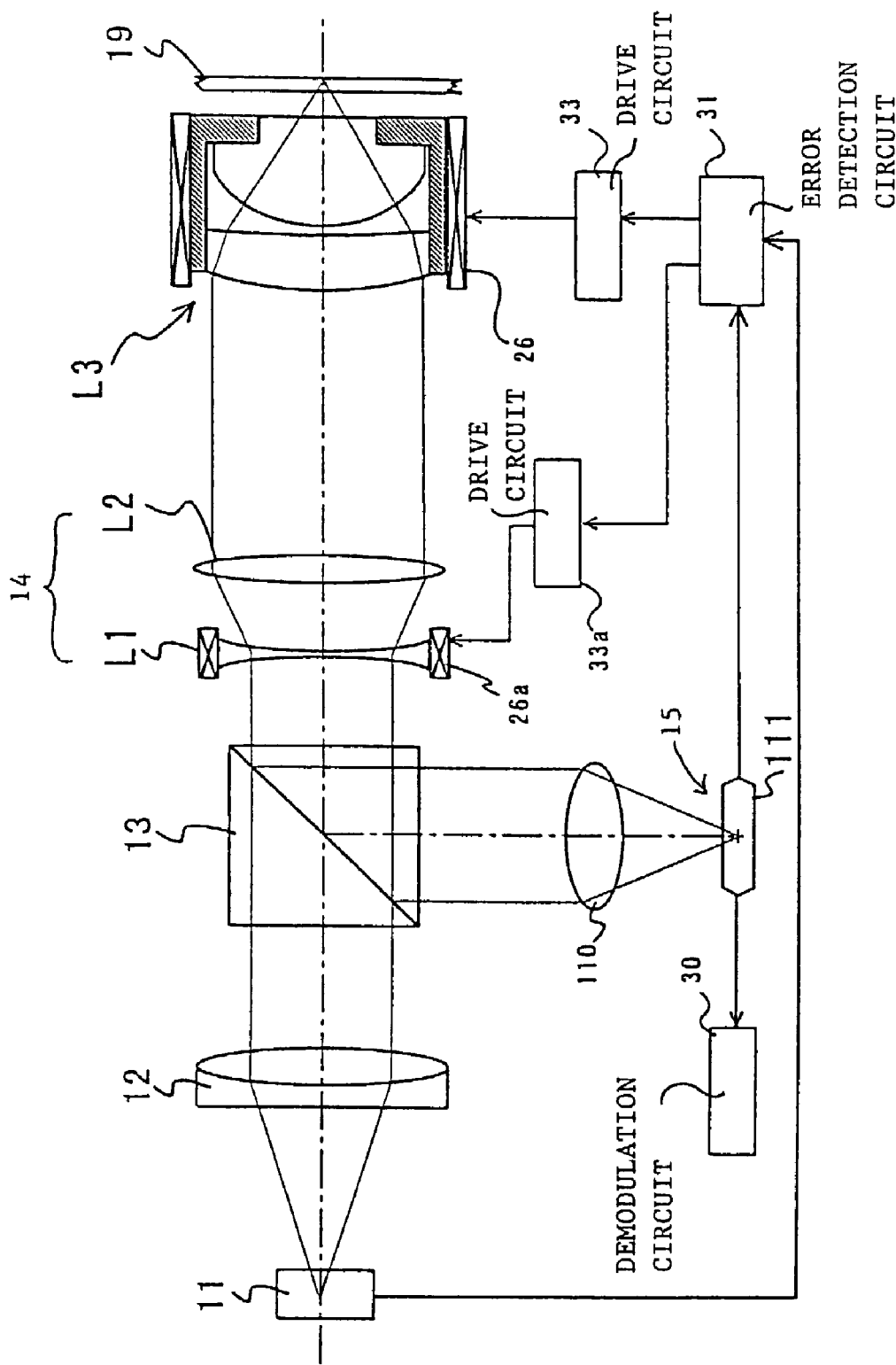
FIG. 1 illustrates a block diagram of an optical pickup used in an information recording and playing back apparatus according to one embodiment of the present invention.

Referring to FIG. 1, an optical system of an optical pickup in an information recording and retrieving apparatus is schematically illustrated. Information or data is recorded on an optical disc 19 and retrieved from the optical disc 19 by this information recording and retrieving apparatus. The optical disc 19 has at least one recording layer. The optical pickup of the information recording and retrieving apparatus includes a blue semiconductor laser 11 that radiates a blue light beam having a short wavelength (400 nm to 415 nm, preferably about 405 nm). The optical pickup also includes a collimator lens 12, beam splitter 13, first lens (negative lens) L1, second lens (positive lens) L2, and an object lens assembly L3. The first lens L1 and second lens L2 define an expander lens assembly 14. The object lens assembly L3 has two lenses. It should be noted that the expander lens assembly 14 may include a plurality of negative lenses (negative lens group) and a plurality of positive lenses (positive lens group). The negative lens group may be designated at L1 and the positive lens group may be designated at L2. The above described elements define an optical system for light beam radiation. A divergent light beam from the semiconductor laser 11 is converted to a parallel light beam by the collimator lens 12. The parallel light beam passes through the beam splitter 13 and the object lens assembly L3 such that the convergent light beam is introduced (directed) to the optical disc 19. The light beam is focused on or in the vicinity of a target recording layer of the optical disc 19, and creates a light spot on a pit train formed on the recording layer. The expander lens assembly 14 moves at least one of the two lenses L1 and L2 away from each other along an optical axis of the expander lens assembly 14 when the convergent light beam should be incident to the object lens assembly L3. On the other hand, the expander lens assembly 14 moves at least one of the two lenses L1 and L2 towards each other when the divergent light beam should be incident to the object lens assembly L3. In this manner, the wave front of the light beam is controlled and the light beam outgoing from the object lens assembly L3 has certain spherical aberration. When the light beam passes through a cover layer of the optical disc 19, the spherical aberration generated by the object lens assembly L3 is counterbalanced by spherical aberration generated in the cover layer. It should be noted that although the object lens assembly L3 having the two lenses is used in the illustrated embodiment, the object lens L3 may have a single lens or three or more lenses.

In addition to the optical system for light radiation, the optical pickup also includes an optical system for light detection. A detection lens 110 is one element of the optical system for light detection. The object lens assembly L3 and beam splitter 13 are also elements of the optical system for light detection. The light beam reflected from the optical disc 19 enters the optical system for light detection. Specifically, the light beam from the optical disc 19 is collected by the object lens assembly L3 and directed to the detection lens 110 by the beam splitter 13. The light beam is converged by the detection lens 110, and passes through an element (not shown) for producing astigmatism such as cylindrical lens and multi-lens unit before reaching a light receiving surface 111 of an optical detector 15. The light beam forms a light spot in the vicinity of a center of the light receiving surface 111.

The optical detector 15 is connected to a demodulation circuit 30 and an error detection circuit 31. The error detection circuit 31 is connected to a drive circuit 33, which drives a mechanism including an actuator 26 for tracking control and focusing control of the object lens assembly L3. The error detection circuit 31 is also connected to a drive circuit 33a for a lens assembly used in a spherical aberration correcting process. The drive circuit 33a drives a mechanism including an actuator 26a to control (shorten and extend) the distance between the first and second lens L1 and L2 of the expander lens assembly 14 along the optical axis.

The optical detector 15 generates an electric signal in accordance with the light spot (image) made in the vicinity of the center of the light receiving surface 111. The optical detector 15 then supplies the electric signal to the demodulation circuit 30 and error detection circuit 31. The demodulation circuit 30 produces a recordation signal on the basis of the electric signal. The error detection circuit 31 generates a focus error signal, tracking error signal, spherical aberration error signal and other servo signals on the basis of the electric signal, and supplies drive signals to the respective actuators via the actuator drive circuits 33 and 33a. Upon receiving the drive signals, the actuators moves the object lens assembly L3, expander lens assembly 14 and other parts by the servo control.

Now, an operation of the optical pickup when retrieving the data from the optical disc 19 will be described.

The parallel light beam passing through the beam splitter 13 is converted to the divergent light beam by the first lens L1. The first lens L1 is a movable lens of the expander lens assembly 14 in this embodiment. The light beam is diverged in accordance with a magnification of the expander lens assembly 14. The divergent light beam is converted to the parallel light beam, the aberration-corrected convergent light beam or the aberration-corrected divergent light beam by the second lens L2 before the light beam is incident to the object lens assembly L3. The first lens L1 is moved by the actuator 26a along the optical axis in accordance with the spherical aberration error signal, thereby correcting the wave front aberration (spherical aberration).

When the cover layer thickness of the optical disc 19 is the reference value, the first lens L1 is positioned at a reference position to cause the parallel light beam to be incident to the object lens assembly L3. When the cover layer thickness is smaller than the reference value, the first lens L1 is moved to enlarge the distance between a principal plane of the first lens L1 and a principal plane of the second lens L2 such that the convergent light is incident to the principal plane of the incident side of the object lens assembly L3. This increases the spherical aberration at the object lens assembly L3. The increased spherical aberration compensates for spherical aberration generated at the cover layer. The spherical aberration at the cover layer decreases when the cover layer thickness is thin(ner). When the cover layer thickness is greater than the reference value, the first lens L1 is moved to shorten the distance between the principal planes of the first and second lenses L1 and L2 such that the divergent light is incident to the principal plane of the incident side of the object lens assembly L3. This decreases the spherical aberration at the object lens assembly L3. The decreased spherical aberration compensates for spherical aberration generated at the cover layer. The spherical aberration at the cover layer increases when the cover layer thickness is thick(er).

A principle of the present invention will be described.

Referring to FIG. 2A, the optical system including the expander lens assembly 14, which has the first and second lenses L1 and L2, and the object lens L3 is considered here. Each lens is a thin lens. The first lens L1 has a focal length f1 and a refractive power p1, the second lens L2 has a focal length f2 and a refractive power p2, and the object lens L3 has a focal length f3 and a refractive power p3. Here, a composite focal length of the three lens L1, L2 and L3 is represented by "f". Then, the optical system shown in FIG. 2A can be expressed by another optical system as shown in FIG. 2B. In other words, the optical system of FIG. 2B is equivalent to the optical system of FIG. 2A. The optical system in FIG. 2B includes a single object lens L having a focal length f. When an incident angle of a main beam of a 3-beam is represented by θ, a spot distance q of the three-beam can be given by the following equation (1):

$$q = f \cdot \tan\theta \quad (1)$$

When a composite focal length after the actuation of the expander lens assembly 14 (i.e., after the spherical aberration correction) is represented by f', a 3-beam spot distance q' is given by the following equation (2):

$$q' = f' \cdot \tan\theta \quad (2)$$

Here, the 3 beams includes a main beam and two sub-beams, and the 3-beam spot distance is a distance between the main beam spot and one of the two sub-beam spots.

Therefore, a variation of the 3-beam spot distance, Δq, is given by the following equation (3):

$$\Delta q = q' - q \quad (3)$$
$$= (f' - f)\tan\theta$$
$$\Delta q / q = (f' - f)/f = f'/f - 1 = p/p' - 1$$

where p (=1/f) represents a refractive power of the composite optical system shown in FIG. 2B. The left term of the equation (3) represents the ratio of the 3-beam spot distance variation (Δq) to the 3-beam spot distance (q) on the recording layer. The 3-beam spot distance changes upon spherical aberration. An object of the invention is to suppress this ratio (Δq/q). The following description deals with conditions to suppress the ratio (Δq/q) below a predetermined value X, as shown in the following equation (4):

$$|\Delta q/q| < X \quad (4)$$

First, the refractive power p of the composite optical system is calculated when the expander lens assembly 14 is not activated, i.e., the distance between the first and second lenses L1 and L2 is the reference value. The refractive power p is given by the following equation (5):

$$p = p1 + p2 + p3 - e1p1(p2+p3) - e2p3(p1+p2) + e1e2p1p2p3 \quad (5)$$
$$= -e2p3(p1 + p2 - e1p1p2) + p3(1 - e1p1)$$

where e1 represents the distance between the principal planes of the first and second lenses L1 and L2, and e2 represents the distance between the principal planes of the second and object lenses L2 and L3 as shown in FIG. 2A.

Since the first and second lenses L1 and L2 are the lenses of the expander lens assembly 14, and the expander lens assembly has a common focal point, a composite refractive power is zero. Accordingly, the following equation (6) holds true:

$$p1 + p2 - e1p1p2 = 0 \quad (6)$$

From the equations (5) and (6), the following equation (7) is obtained:

$$p = p3(1 - e1p1) = -p1p3/p2 \quad (7)$$

When the principal plane distance e1 of the expander lens assembly 14 changes from e1 to e1+ε, i.e., when the first lens L1 is moved by ε, the composite refractive power p' is calculated by substituting e1+ϵ for e1 in the equation (5). Therefore, the following equation (8) is established:

$$p' = p1 + p2 + p3 - (e1 + \varepsilon)p1(p2 + p3) - \quad (8)$$
$$e2p3(p1 + p2) + (e1 + \varepsilon)e2p1p2p3$$
$$= p - \varepsilon(p1p2 + p1p3 - e2p1p2p3)$$

From the equations (3), (7) and (8), the relationship between the ratio of the 3-beam spot distance variation and the principal plane distance variation of the expander lens assembly 14 can be expressed as follows:

$$\Delta q/q = p/p' - 1 \quad (9)$$
$$= p/\{p - \varepsilon(p1p2 + p1p3 - e2p1p2p3)\} - 1$$
$$= -(p1p3/p2)/\{-p1p3/p2 - \varepsilon p1(p2 + p3 - e2p2p3)\} - 1$$
$$= (f2/f3)/\{f2/f3 + \varepsilon(1/f2 + 1/f3 - e2/f2f3)\} - 1$$
$$= f2^2/\{f2^2 + \varepsilon(f2 + f3 - e2)\} - 1$$

Then the equation (4) can be expressed as follows, using the equation (9):

$$\left| \frac{f_2^2}{f_2^2 + \varepsilon(f_2 + f_3 - e_2)} - 1 \right| < X \quad (10)$$

The equation (10) shows an optimal range of the principal plane distance e2. It is understood from the equation (10) that the optimal range is a function of the movement (amount of shift) ϵ of the first lens L1 of the expander lens assembly 14. How much the principal plane distance e1 of the expander lens assembly 14 should be changed in order to correct (compensate for) certain spherical aberration (i.e., optical disc thickness error) depends upon the structure of the expander lens assembly 14. Therefore, the equation (10) is clumsy in the current form. In practice, the value ϵ necessary to correct particular optical disc thickness error is first calculated, and put into the equation (10).

The correction of the spherical aberration is effected by directing the convergent light beam or divergent light beam, not the parallel light beam, into the object lens. How convergent or divergent the incident light beam is is expressed by a lateral (transverse) magnification β to the object lens. In an optical system shown in FIG. 3, the lateral magnification β is given by the following equation (11):

$$\beta = s'/s \quad (11)$$

where s represents the distance between the object point and the object lens L, and s' represents the distance between the object lens L and the image point.

s=∞ when the incident light beam is a parallel light beam. When s=∞, β=0. When β<0, the incident light beam is a divergent light beam (as shown in FIG. 3), and when β>0, the incident light beam is a convergent light beam. As the absolute value of β becomes larger, the distance s becomes smaller and large spherical aberration correction becomes needed.

Figure 4:
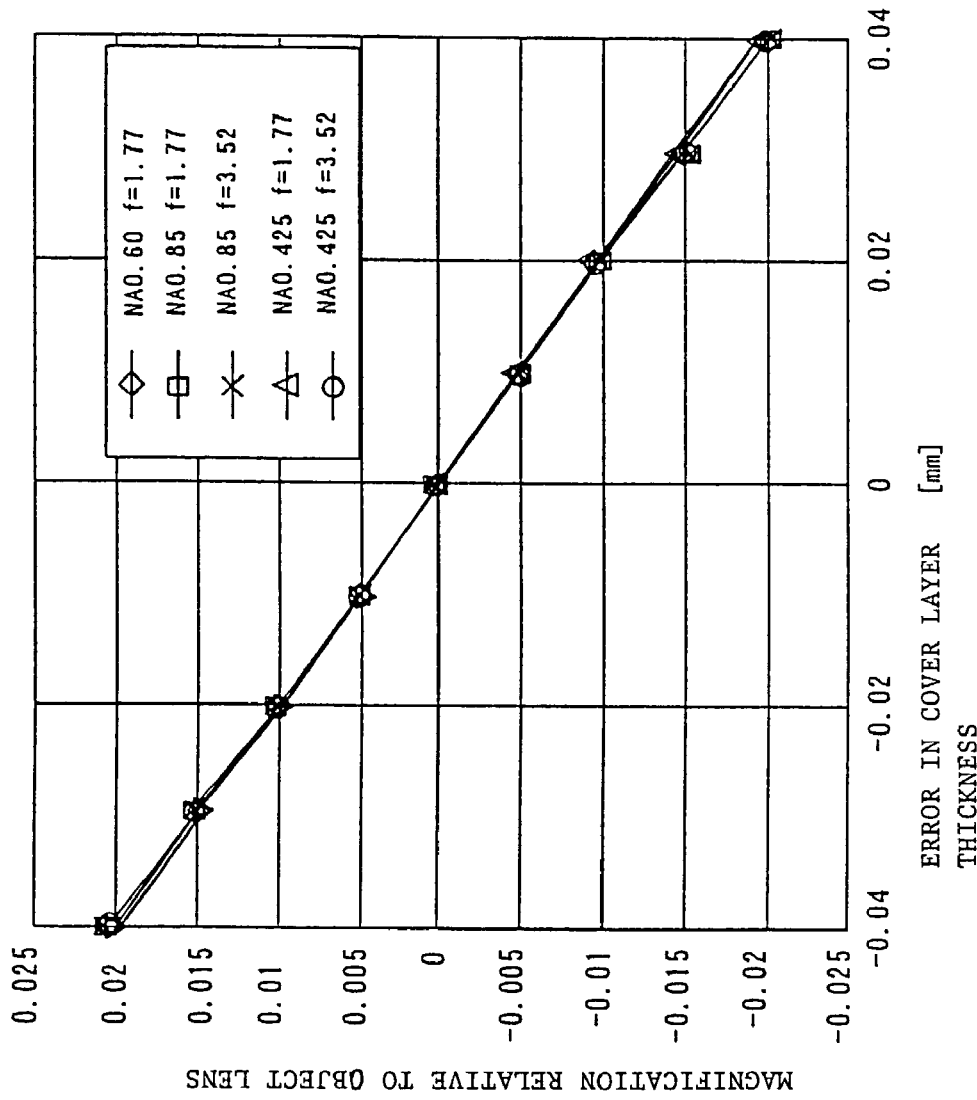
FIG. 4 is a graph showing relationship between the lateral magnification and an error in a cover layer thickness of an optical disc.

Referring to FIG. 4, the lateral magnification β needed to correct the thickness error of the optical disc cover layer is calculated for various object lenses having different numerical apertures (NA) and focal lengths. All the object lenses, however, are designed such that small aberration occurs on a substrate having 0.1 mm thickness. The horizontal axis of the graph shown in FIG. 4 indicates the thickness error of the cover layer (mm), and the vertical axis represents a value (magnification) expressed by the following equation:

$$\frac{\beta f_3}{\sqrt[4]{NA}} \text{ (mm)}$$

where f3 represents the focal length of the object lens and NA represents the numerical aperture of the object lens.

It is understood that the magnification ($\beta f3/\sqrt[4]{NA}$) needed to correct particular spherical aberration is substantially constant regardless of the types of the lens. The relationship between β and t (cover layer thickness error) is given by the following equation (12):

$$\frac{\beta f_3}{\sqrt[4]{NA}} = -\frac{1}{2}t \quad \beta = -\frac{1}{2} \cdot \frac{\sqrt[4]{NA}}{f_3} t \quad (12)$$

Figure 5:
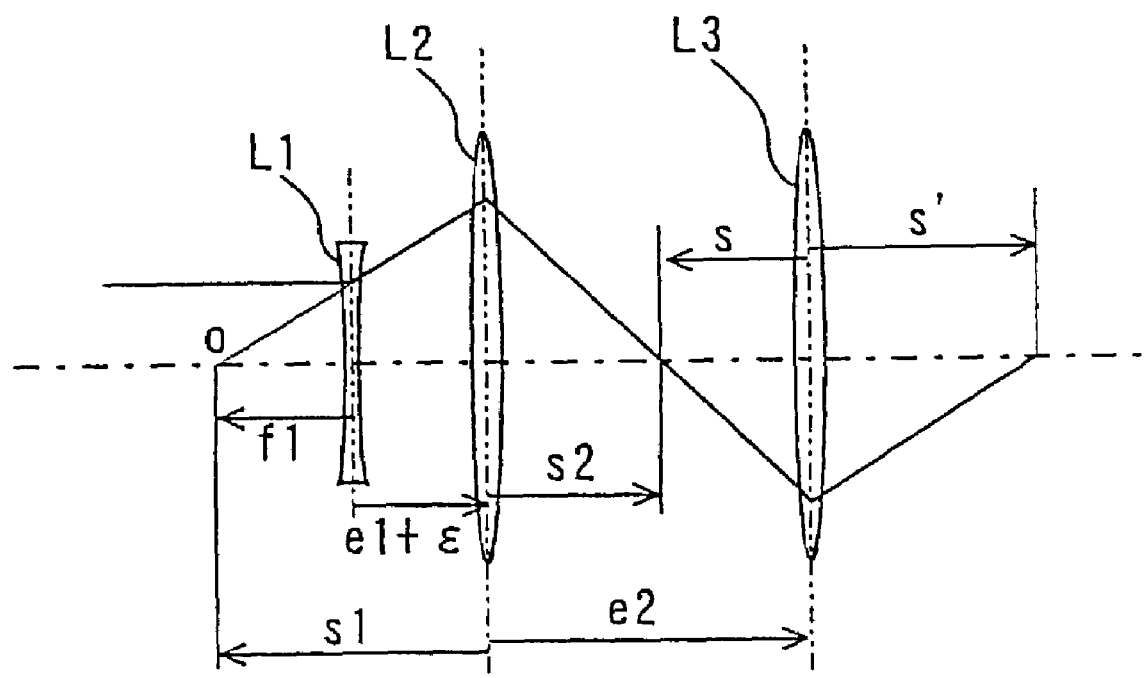
FIG. 5 illustrates an optical system of the optical pickup shown in FIG. 1 depicted in accordance with a paraxial imaging method.

Next, the relationship between ϵ and β is considered. In FIG. 5, since it can be assumed that the light beam incident to the second lens L2 derives from an imaginary (phantom) object point O, the following equation (13) is established with respect to the second lens L2 from the paraxial imaging formula:

$$1/s2 = 1/s1 + 1/f2 = 1/\{f1 - (e1 + \varepsilon)\} + 1/f2 \quad (13)$$
$$= (f1 + f2 - e1 - \varepsilon)/(f1 - e1 - \varepsilon)f2$$
$$= -\varepsilon/(-f2 - \varepsilon)f2$$
$$(\because f1 + f2 = e1)$$

Accordingly, $s2 = (f2 + \varepsilon)f2/\varepsilon$

Further, the following equation is established with respect to the object lens L3 from the paraxial imaging formula:

$$1/s' = 1/s + 1/f3 = (s+f3)/sf3$$

$$\beta = s'/s = f3/(s+f3)$$

Since s=s2−e2 holds true, as understood from the ray tracing shown in FIG. 5, the following equation (14) is established:

$$\beta = f3/(s2 - e2 + f3) \quad (14)$$
$$= \varepsilon f3/\{(f2 + \varepsilon)f2 + (-e2 + f3)\varepsilon\}$$
$$= \varepsilon f3/\{f2^2 + (f2 + f3 - e2)\varepsilon\}$$

By solving the equation (14) with respect to ϵ, the following equation (15) is obtained:

$$\beta(f2^2 + (f2 + f3 - e2)\varepsilon) = \varepsilon f3 \quad (15)$$
$$\varepsilon(f3 - \beta(f2 + f3 - e2)) = \beta f2^2$$
$$\varepsilon = \beta f2^2/\{f3 - \beta(f2 + f3 - e2)\}$$

-continued $$= f2^2 / \{(f3/\beta) - (f2 + f3 - e2)\}$$

By inputting the equation (12) into the equation (15), the following equation (16) results:

$$\epsilon = f2^2/\{Q-(f2+f3-e2)\} \quad (16)$$

This equation is complicated so that it is written to the following equation:

$$Q = -\frac{2f_3^2}{t\sqrt[4]{NA}}$$

In this manner, the value 68 is obtained relative to the cover layer thickness error t. By inputting the value $\epsilon$ into the equation (10), the following equation (17) is obtained:

$$\left| \frac{-\left\{ \frac{f_2^2(f_2+f_3-e_2)}{Q-(f_2+f_3-e_2)} \right\}}{f_2^2 + \left\{ \frac{f_2^2(f_2+f_3-e_2)}{Q-(f_2+f_3-e_2)} \right\}} \right| < X \quad (17)$$

$$\left| \frac{-(f_2+f_3-e_2)}{Q-(f_2+f_3-e_2)+(f_2+f_3-e_2)} \right| < X$$

$$\left| \frac{e_2 - (f_2+f_3)}{Q} \right| < X$$

$$(f_2+f_3) - X|Q| < e_2 < (f_2+f_3) + X|Q|$$

$$(f_2+f_3) - \frac{2f_3^2(\text{mm})^{-1}}{|t|\sqrt[4]{NA}} X < e_2 < (f_2+f_3) + \frac{2f_3^2(\text{mm})^{-1}}{|t|\sqrt[4]{NA}} X$$

It is expected that the expander lens assembly corrects the error of the optical disc thickness if the error is some ±30 microns or less.

An admissible deviation of the 3-beam spot distance in an DPP method is estimated (calculated). The 3-beam includes a main beam and two sub-beams on both sides of the main beam. A main beam spot is created on a track and two sub-beam spots are created between adjacent tracks. Upon activation of the expander lens assembly, the sub-beam (spot) deviates from the original distance q by Δq. In an actual application, a position of the sub-beam in the radial direction of the optical disc 19 only influences the gain of the DPP method. Therefore, a component Δa of the sub-beam deviation in the radial direction of the optical disc 19 influences the gain of the DPP method. Since there is analogy between Δq and Δa, the following equation holds true:

$$\Delta a/a = \Delta q/q$$

where a represents the radial component of the beam spot distance.

Figure 6:
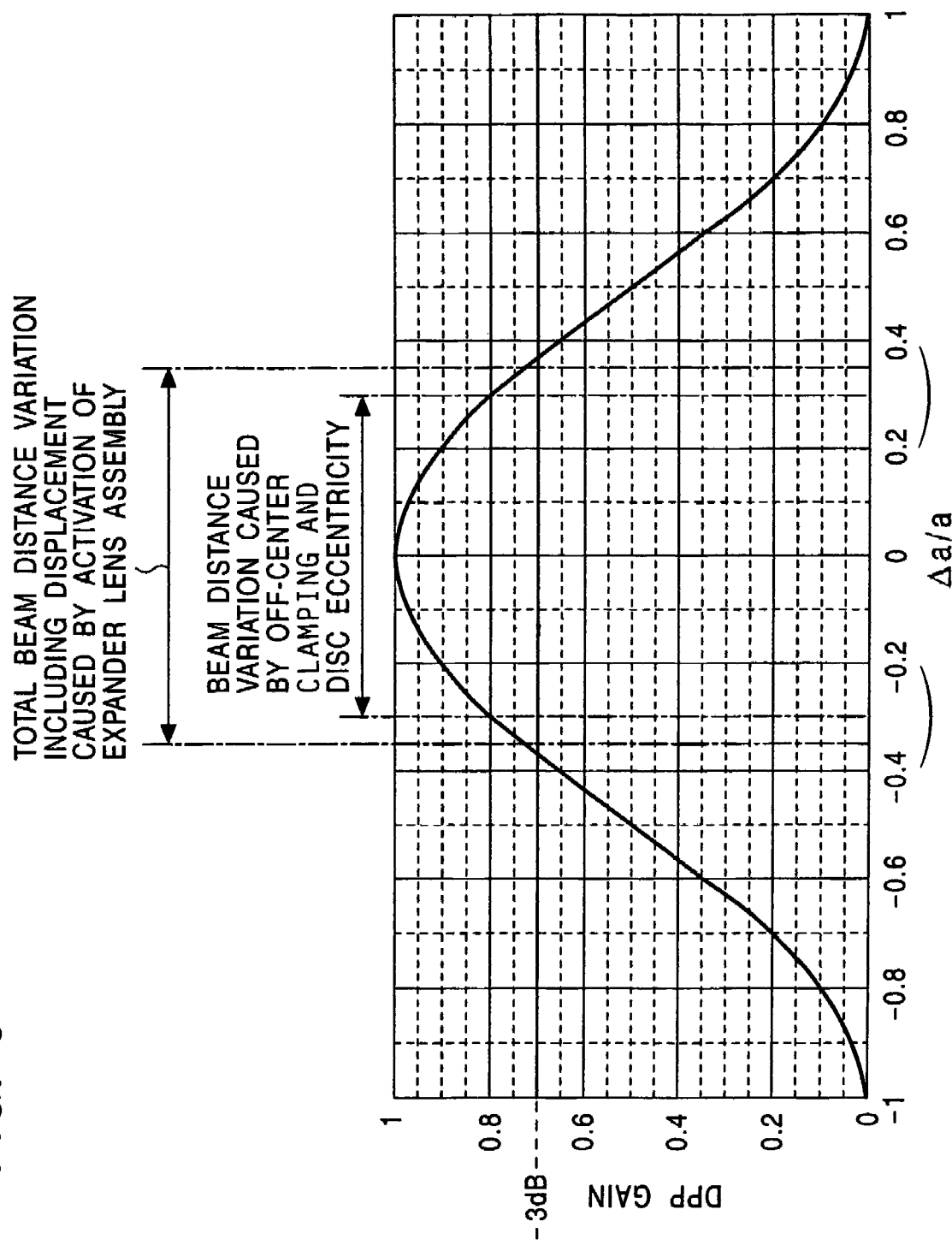
FIG. 6 is a graph showing relationship between a DPP gain and a beam distance variation of the optical pickup of the invention.

Referring to FIG. 6, illustrated is a graph showing the relationship between the ratio Δa/a (horizontal axis) and the DPP gain variation (vertical axis). In order to ensure appropriate playability during the optical disc playback operation, it is desired that the drop of the DPP gain is suppressed to about 3 dB (about 29%) or less.

On the other hand, off-center clamping of the optical disc and eccentricity of the optical disc result in deviation of the beam position by about ±30% in the ratio Δa/a. This decreases the gain in a smaller range than the beam spot distance deviation. In order to hold the total gain drop (including the gain drop caused by the beam spot distance variation due to the activation of the expander lens assembly) within 3 dB, the beam spot distance variation due to the activation of the expander lens assembly needs to fall within about ±5% in terms of the ratio Δa/a (=the ratio Δq/q).

FIG. 6 shows the deviation of the beam spot distance caused by the expander lens assembly and the deviation of the beam spot distance caused by the off-center clamping of the optical disc and eccentricity of the optical disc. It is understood from the graph of FIG. 6 that the deviation of the 3-beam spot position caused by the operation of the expander lens assembly (movement of the first lens L1) is desired to be about 5% or less when the gain of the DPP method should be 80% or more, and the gain drop caused by the off-center clamping and eccentricity of the optical disc should be considered.

By inputting $|t|=3/100$ mm and $X=5/100$ into the equation (17), the following equation (18) is obtained:

$$(f_2+f_3) - \frac{10f_3^2(\text{mm})^{-1}}{3\sqrt[4]{NA}} < e_2 < (f_2+f_3) + \frac{10f_3^2(\text{mm})^{-1}}{3\sqrt[4]{NA}} \quad (18)$$

The above description deals with a case where the first lens L1 of the expander lens assembly 14 is moved. Now, a case where the second lens L2 is moved will be described. When the principal plane distance of the expander lens assembly 14 changes from e1 to e1+$\epsilon$, the principal plane distance e2 between the second lens L2 and the object lens L3 changes from e2 to e2-$\epsilon$ at the same time. By inputting e2-$\epsilon$ into the term $\epsilon$ of the equation (8), the following equation results:

$$p' = p1 + p2 + p3 - (e1+\varepsilon)p1(p2+p3) - \quad (19)$$
$$\quad (e2-\varepsilon)p3(p1+p2) + (e1+\varepsilon)(e2-\varepsilon)p1p2p3$$
$$= p - \varepsilon(p1p2 + p1p3 - e2p1p2p3) +$$
$$\quad \varepsilon p3(p1+p2 - e1p1p2) - \varepsilon^2 p1p2p3$$
$$= p - \varepsilon(p1p2 + p1p3 - e2p1p2p3) - \varepsilon^2 p1p2p3$$
$$(\because p1+p2 - e1p1p2 = 0)$$

By inputting the equations (7) and (22) into the equation (3), the following equation (20) results:

$$\Delta q/q = p/\{p - \varepsilon(p_1p_2 + p_1p_3 - e_2p_1p_2p_3) - \varepsilon^2 p_1p_2p_3\} - 1 \quad (20)$$
$$= (-p_1p_3/p_2)/\{-p_1p_3/p_2 - \varepsilon p_1(p_2+p_3 - e_2p_2p_3) -$$
$$\quad \varepsilon^2 p_1p_2p_3\} - 1$$
$$= (f_2/f_3)/\{f_2/f_3 + \varepsilon(1/f_2 + 1/f_3 - e_2/f_2f_3) + \varepsilon^2/f_2f_3\} - 1$$
$$= f_2^2/\{f_2^2 + \varepsilon(f_2+f_3 - e_2) + \varepsilon^2\} - 1$$

Since $f_2^2 \gg \epsilon^2$, the term $\epsilon^2$ can be ignored. Then, the following equation (21) is obtained:

$$\Delta q/q = f_2^2/\{f_2^2 + \epsilon(f_2+f_3-e_2)\} - 1 \quad (21)$$

This equation is exactly the same as the equation (9). Accordingly, the equation (10) also holds true.

In the ray tracing shown in FIG. 5, when the principal plane distance e2 is replaced by e2-$\epsilon$, the equation (14) becomes the following equation (22):

$$\beta = f3/(s2 - (e2 - \varepsilon) + f3) \quad (22)$$
$$= \varepsilon f3 / \{(f2 + \varepsilon)f2 + (-e2 + \varepsilon + f3)\varepsilon\}$$
$$= \varepsilon f3 / \{f2^2 + (f2 + f3 - e2)\varepsilon + \varepsilon^2\}$$

Since $f_2^2 \gg \varepsilon^2$, the term $\varepsilon^2$ can be ignored. Then, the following equation (23) is obtained:

$$\beta = \frac{\varepsilon f_3}{f_2^2 + (f_2 + f_3 - e_2)\varepsilon} \quad (23)$$

This is exactly the same as the equation (14).

The same equations as the equations (15) to (16) are obtained after the equation (23), and therefore the equation (18) is obtained. Accordingly, when the second lens L2 is moved, the range given by the equation (18) is the optimal range of the principal plane distance e2. As mentioned earlier, the range given by the equation (18) is also the optimal range of the principal plane distance e2 when the first lens L1 is moved.

Figure 7:
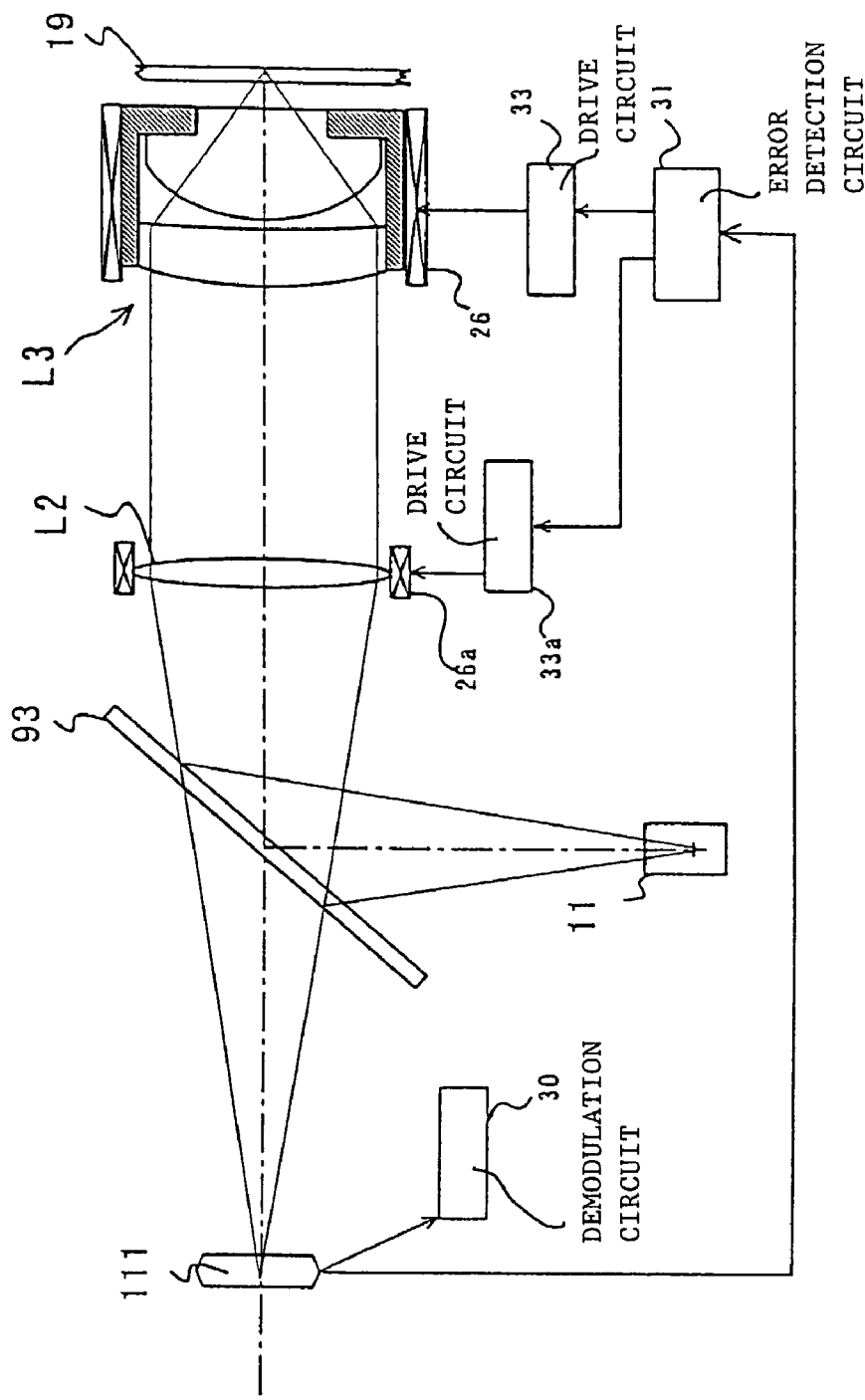
FIG. 7 illustrates a block diagram of an optical pickup of an information recording and playing back apparatus according to another embodiment of the present invention.

Although the expander lens assembly 14 having the two lenses is utilized as the means for compensating for the spherical aberration in the above described embodiment, there is an alternative means for compensating for the spherical aberration. For example, the spherical aberration can be corrected by adjusting the distance between the collimator lens and light source. Such structure is illustrated in FIG. 7. Specifically, a finite optical system including a beam splitter 93 and a collimator lens L2 can be used in the information recording/playing back apparatus of the invention. The beam splitter 93 is a parallel plate. Similar reference numerals are used to designate similar elements in FIGS. 1 and 7. In FIG. 7, the collimator lens L2 can be moved to change (adjust) the distance between the light source 11 and collimator lens L2. Alternatively, the light source (semiconductor laser 11) may be moved along the optical axis to change the spherical aberration. In general, the distance between the collimator lens L2 and the light source 11 is set to a focal length of the collimator lens L2. By changing this distance, the light beam emerging (outgoing) from the collimator lens L2 becomes non-parallel. Thus, it is possible to control the magnification ($\beta f3/^4\sqrt{NA}$) and therefore possible to compensate for the spherical aberration. The principle in this instance is the same as a case where the expander lens assembly is used (FIG. 1). In FIG. 7, it can be considered that the light beam from the light source 11 is directly incident to the collimator lens L2, instead of directing the parallel light beam to the expander lens assembly. Then, the light beam after the collimator lens L2 in FIG. 7 is the same as the light beam after the second lens L2 in FIG. 1. As a consequence, it can be said that the spherical aberration compensation by the collimator lens is equivalent to the spherical aberration compensation by the expander lens assembly.

Moving the collimator lens L2 along the optical axis to compensate for the spherical aberration is equivalent to moving the second lens L2 of the expander lens assembly 14. Moving the light source 11 along the optical axis to compensate for the spherical aberration is equivalent to moving the first lens L1 of the expander lens assembly 14.

EXAMPLES

Under the conditions shown in Table I, the variations of the 3-beam spot distance are calculated when the expander lens assembly 14 is activated, using the ray tracing simulation on the expander lens assembly 14 and object lens L3. Major specifications of the first and second lenses L1 and L2 of the expander lens assembly 14 and the object lens L3 are shown below:

L1 focal length: −17.821 mm
L2 focal length: 21.475 mm
L3 focal length: 1.770 mm
L3 numerical aperture: 0.85
Light source wavelength: 405 nm

TABLE I

| SRF | RADIUS (R) mm | THICKNESS mm | INDEX |
|---|---|---|---|
| 1 | −14.70000 | 1.00000 | 1.53020 |
| 2 | 27.07400 | 2.50000 | 1.00000 |
| 3 | 43.69000 | 1.50000 | 1.53020 |
| 4 | −15.21600 | 10.00000 | 1.00000 |
| 5 | 1.99059 | 1.20000 | 1.50568 |
| 6 | 9.07660 | 1.30000 | 1.00000 |
| 7 | 1.12659 | 1.30000 | 1.76250 |
| 8 | 0.00000 | 0.13000 | 1.00000 |
| 9 | 0.00000 | 0.10000 | 1.61902 |
| 10 | 0.00000 | 0.00000 | 1.00000 |
| IMS | 0.00000 | 0.00000 | 1.00000 |

| TERM | SRF-5 | SRF-6 | SRF-7 |
|---|---|---|---|
| CC | −2.42749E+00 | 3.22130E+01 | −1.83113E−01 |
| A4 | 3.68190E−02 | 1.16497E−02 | 8.88776E−03 |
| A6 | −2.46882E−03 | −1.00343E−03 | −5.31070E−03 |
| A8 | 9.44504E−04 | −9.26839E−04 | −1.34467E−02 |
| A10 | −1.43091E−04 | 4.81807E−04 | −6.19420E−04 |
| A12 | 3.09315E−05 | −8.34006E−05 | −7.26055E−03 |

In Table I, SRF represents the refraction surface (lens) number, starting from the surface proximal to the light source. RADIUS (mm) represents a radius of curvature. THICKNESS (mm) represents a distance between adjacent refraction surfaces. INDEX represents an index of refraction. TERM represents an aspheric coefficient. SRF-1 and -2 represent the first lens L1, SRF-3 and -4 represent the second lens L2, SRF-5 and 6 represent one lens of the object lens assembly L3 on the incident side, and SRF-7 and -8 represent the other lens of the object lens assembly L3 on the emergent side. SRF-9 and -10 represent the disc cover layer.

Figure 8:
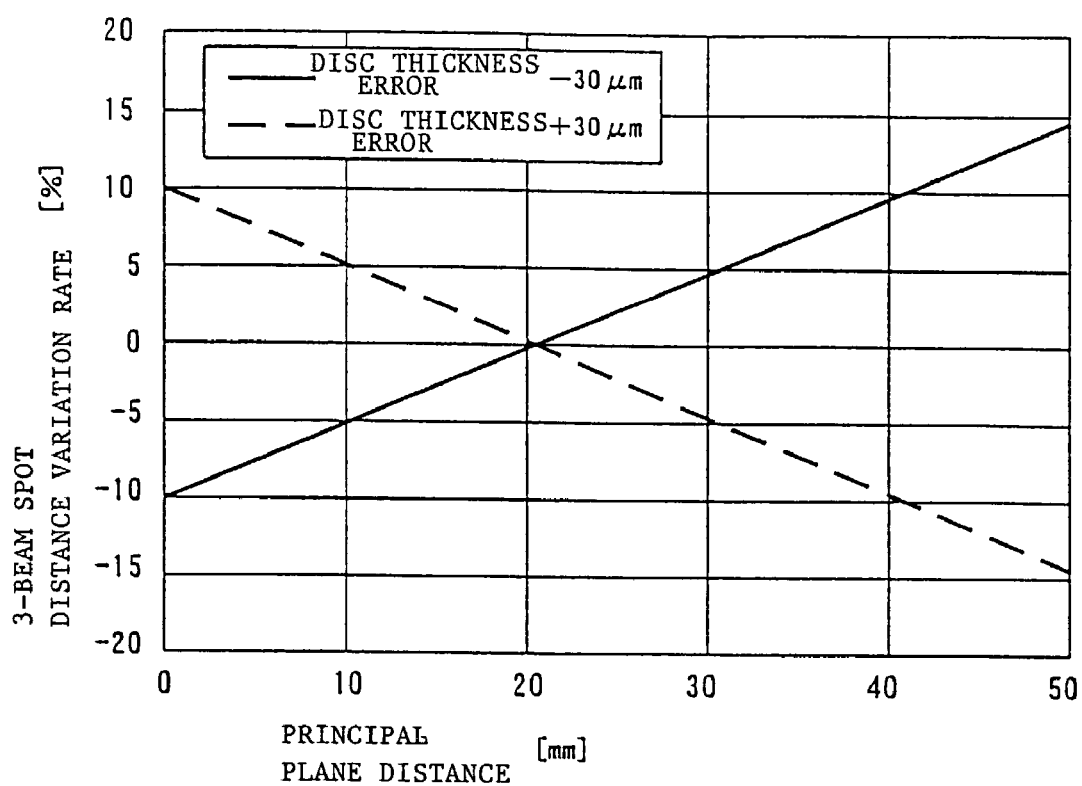
FIG. 8 is a graph showing relationship between a 3-beam spot distance variation rate and principal plane distance.

The simulation results are shown in FIG. 8. The rate of variations of the 3-beam spot distance is plotted as a function of the principal plane distance e2 in the graph (FIG. 8) when the optical disc has an error of ±30 microns in thickness and the expander lens assembly is activated to minimize the aberration on the optical axis at the image (imaging) surface. The rate of the 3-beam spot distance variations is calculated by dividing the variation of the 3-beam spot distance upon the correction by the expander lens assembly, by the position of the 3-beam before the correction.

The range defined by the equation (18) is as follows:

12.369 mm<e2<34.121 mm where e2 represents the principal plane distance between the second lens L2 and object lens L3.

Since the principal plane of the second lens L2 on the emergent side lies 0.255 mm ahead of the peak of the second lens L2 and the principal plane of the object lens L3 on the incident side lies 2.503 mm behind the peak of the third lens L3, the principal plane distance e2' between the lens L2 and L3 along the optical axis can be given as follows: e2'=e2−0.255−2.503. Therefore, 9.61 mm<e2'<31.36 mm. It is understood from the simulation results (FIG. 8) that the area from +5% to −5% of the 3-beam spot distance variation rate generally complies with the above equation.

It is therefore apparent that the beam spot distance variation can be suppressed within a desired (expected) range when the object lens of the optical pickup has a numerical aperture of 0.80 or more. It is also confirmed that the beam spot distance variation can be suppressed in a desired manner when the focal length of the object lens is 2 mm or less.

Since the converging of the light beam is altered by the expander lens assembly or the like, the numerical aperture of the object lens remains unchanged even if the spherical aberration is corrected in the optical system including the optical pickup. Thus, it is possible to obtain the same MTF characteristics on the respective recording layers when the information is recorded on and retrieved from the multi-layer recording medium (e.g., two-layer optical disc). It should be noted that the present invention is applicable to an optical system using a so-called solid immersion lens, of which numerical aperture is greater than one, as the object lens.

As described above, even when the movable lens of the expander lens assembly moves or even when the collimator lens or the object lens moves, to correct the spherical aberration caused by an error of about 30 microns in the optical disc thickness, it is possible to restrict a variation of a multi-beam spot distance within 5% on the recording layer of the optical disc. As a result, it is feasible to reduce a variation in sensitivity of the DPP method and a variation in a delay time of the CTC method. It is also feasible to reduce a variation in the numerical aperture which is caused when the spherical aberration is corrected in the optical disc. This results in a reduction of a variation in information recording and retrieving characteristics which is caused when the spherical aberration is corrected.

This application is based on a Japanese patent application No. 2001-263817, and the entire disclosure thereof is incorporated herein by reference.

What is claimed is:

1. An optical pickup for recording information on an optical recording medium and retrieving information from the optical recording medium by radiating a light beam on the optical recording medium comprising:
    a light source which emits the light beam;
    an object lens which converges the tight beam into a convergent light beam and directs the convergent light beam to a recording layer of the optical recording medium; and
    an aberration correction lens assembly between the light source and the object lens and including at least one movable lens which is movable in an optical axis direction, the aberration correction lens assembly controlling the movable lens to convert the light beam to one of a convergent light beam and a divergent light beam so as to correct spherical aberration, wherein a distance between a principal plane of the aberration correction lens assembly on a light emergent side and a principal plane of the object lens on a light incident side falls within a range determined in accordance with a numerical aperture of the object lens, a focal length of the aberration correction lens assembly on the light emergent side, and a focal length of the object lens,
    wherein the distance between the principal plane of the aberration correction lens
    assembly on the light emergent side and the principal plane of the object lens is determined by the following equation:

$$(f_2 + f_3) - \frac{10 f_3^2 (\text{mm})^{-1}}{3\sqrt[4]{NA}} < e_2 < (f_2 + f_3) + \frac{10 f_3^2 (\text{mm})^{-1}}{3\sqrt[4]{NA}}$$

where $e_2$ represents the distance between the principal plane of a lens in the aberration correction lens assembly on the most light emergent side and the principal plane of the object lens, NA represents the numerical aperture of the object lens, $f_2$ represents the focal length of the aberration correction lens assembly on the light emergent side, and $f_3$ represents the focal length of the object lens,
    wherein the numerical aperture of the object lens is not less than 0.80, and
    wherein the focal length of the object lens is not greater than 2 mm.

2. The optical pickup according to claim 1, wherein the aberration correction lens assembly includes a positive lens group and a negative lens group, the movable lens included in at least one of the positive and negative lens groups, and a distance between a principal plane of the positive lens group and a principal plane of the negative lens group along the optical axis direction being changeable by the movable lens.

3. The optical pickup according to claim 2, wherein the aberration correction lens assembly comprises an expander lens assembly.

4. The optical pickup according to claim 1, wherein the movable lens comprises a collimator lens which converts the light beam emitted from the light source into a generally parallel light beam.

5. An optical pickup for recording information on a recording medium and retrieving information from the recording medium by radiating a light beam on the recording medium, comprising:
    first lens means for directing a convergent light beam to a recording layer of the recording medium; and
    second lens means located between a light source and the first lens means and including at least one movable lens such that the movable lens converts the light beam to one of a convergent light beam and a divergent light beam so as to correct spherical aberration,
    wherein a distance between a principal plane of the second lens means on a light emergent side and a principal plane of the first lens means on a light incident side falls within a range determined in accordance with a numerical aperture of the first lens means, a focal length of the second lens means on the light emergent side, and a focal length of the first lens means,
    wherein the distance between the principal plane of the second lens means on the light emergent side and the principal plane of the first lens means on the light incident side is determined by the following equation:

$$(f_2 + f_3) - \frac{10 f_3^2 (\text{mm})^{-1}}{3\sqrt[4]{NA}} < e_2 < (f_2 + f_3) + \frac{10 f_3^2 (\text{mm})^{-1}}{3\sqrt[4]{NA}}$$

where $e_2$ represents the distance between the principal plane of the second lens means on the light emergent side and the principal plane of the first lens means, NA represents the numerical aperture of the first lens means, $f_2$ represents the focal length of the second lens means on the light emergent side, and $f_3$ represents the focal length of the first lens means, wherein the numerical aperture of the first lens means is not less than 0.80, and wherein the focal length of the first lens means is not greater than 2 mm.

6. The optical pickup according to claim 5, wherein the second lens means includes a positive lens group and a negative lens group, the movable lens included in at least one of the positive and negative lens groups, and a distance between a principal plane of the positive lens group and a principal plane of the negative lens group along an optical axis direction being changeable by the movable lens.

7. The optical pickup according to claim 6, wherein the second lens means comprises an expander lens assembly.

8. The optical pickup according to claim 5, wherein the movable lens comprises a collimator lens which converts the light beam emitted from the light source into a generally parallel light beam.

9. An optical pickup for recording information on a recording medium and retrieving information from the recording medium by radiating a light beam on the recording medium comprising:

a light source which emits the light beam;

an object lens which converges the light beam into a convergent light beam and directs the convergent light beam to the recording medium;

a collimator lens located between the light source and the object lens; and a mechanism for moving at least one of the light source and the collimator lens to convert the light beam, incident on the object lens, to one of a convergent light beam and a divergent light beam so as to correct spherical aberration, wherein a distance between a principal plane of the collimator lens on a light emergent side and a principal plane of the object lens on a light incident side falls within a range determined in accordance with a numerical aperture of the object lens, a focal length of the collimator lens on the light emergent side, and a focal length of the object lens, wherein the distance between the principal plane of the collimator lens on the light emergent side and the principal plane of the object lens on the light incident side is determined by the following equation:

$$(f_2 + f_3) - \frac{10 f_3^2 (\text{mm})^{-1}}{3\sqrt[4]{NA}} < e_2 < (f_2 + f_3) + \frac{10 f_3^2 (\text{mm})^{-1}}{3\sqrt[4]{NA}}$$

where $e_2$ represents the distance between the principal plane of the collimator lens on the light emergent side and the principal plane of the object lens, NA represents the numerical aperture of the object lens, $f_2$ represents the focal length of the collimator lens on the light emergent side, and $f_3$ represents the focal length of the object lens, wherein the numerical aperture of the object lens is not less than 0.80, and wherein the focal length of the object lens is not greater than 2 mm.

10. The optical pickup according to claim 9, wherein the collimator lens converts the light beam emitted from the light source into a generally parallel light beam.

* * * * *